Oct. 23, 1956     L. E. BLILEY     2,768,086

METHOD OF PREPARING A PRECOOKED FROZEN FOOD PACKAGE

Filed Oct. 20, 1954

INVENTOR
Leo E. Bliley

BY Beale and Jones

ATTORNEYS

United States Patent Office 2,768,086
Patented Oct. 23, 1956

2,768,086

METHOD OF PREPARING A PRECOOKED FROZEN FOOD PACKAGE

Leo E. Bliley, Virginia Beach, Va.

Application October 20, 1954, Serial No. 463,445

3 Claims. (Cl. 99—192)

This invention relates to packaged frozen food products of Italian-type cookery. The packaged food product of the present invention comprises a hermetically sealed container enclosing a frozen, ready-to-heat and eat food product, in which there is a starchy-type food portion and a condiment or sauce portion which is kept separate from the starchy-type food portion.

More specifically, the present invention relates to an Italian-type food product such as spaghetti with a sauce, packaged as a frozen food product. According to the present invention, the sauce and spaghetti are frozen separately but are packaged in a single container. The product, when thawed, heated and served, presents precisely the same appearance, taste, and texture as a fresh food product which was prepared immediately before serving.

Prior to the present invention, other frozen Italian-type fod products had been on the market. For example, there has been available a frozen spaghetti dinner in which the spaghetti and sauce are frozen together, then heated and eaten together. This type of product is very similar to canned spaghetti in that the spaghetti, through prolonged contact with the sauce, becomes soggy, loses strength, and becomes saturated with the oils and flavorings from the sauce.

Spaghetti and similar products which have been canned or frozen according to prior methods, while they may be fine food products, developed as the result of much experimentation, nevertheless lack the crispiness, flavor and aroma of freshly-prepared products. One of the secrets of good cooking is the provision in the food item of an uneven distribution of taste elements. Thus, the best salads are those in which there are relatively large pieces of different foods mixed together. Should these different salad foods be comminuted into fine, admixed particles, the delightful taste of the salad would be lost because the ground or chopped particles would blend or blur all of the different flavoring elements together. Such a mixture of fine particles would have a flat or bland taste, rather than the stimulating mixture of flavors which is available from a salad.

The same is true of products such as spaghetti. The taste of the sauce can be best appreciated when it is freshly prepared and placed over freshly cooked spaghetti. When the individual components of a sauce are allowed to stand together for an extended period, as they do in a can, the zesty taste of the sauce tends to be lost because the taste is "blurred." When a sauce and the spaghetti with which it is to be used are allowed to stand together for a period, a further loss in taste sensation is observable, because the sauce loses flavor in and to itself, and a further "blurring" of the taste of the different food components occurs between the spaghetti and the sauce.

The same general observations are true with respect to other foods of the same type, such as ravioli, manimotti, pennoni, gnocchi, and rice preparations. Furthermore, any prolonged contact between a starchy food product and the sauce with which it is to be served results in a sogginess and gradual deterioration, and even some disintegration which makes the food much less palatable.

Accordingly, an object of the present invention is to provide a frozen food product which includes a starchy food and a sauce therefor which product can be thawed and heated to provide a food which closely simulates a freshly-prepared product.

A further object of the invention is to provide a simple and economical method for the packaging of spaghetti with sauce so that when consumed it will appear to have been freshly prepared.

These and many other objects of the present invention are achieved by a process in which the starchy food and the condiment or sauce portion are separately prepared and cooked. The sauce portion is then placed in a hermetically sealable package and it is frozen. After the sauce portion is frozen, the starchy food is superposed on the frozen sauce so as to fill the package. The entire package may then be frozen and hermetically sealed.

The separate freezing of the two components is an effective way for preventing undesirable contact between the sauce and the starchy-food product. The freezing process also prevents loss of flavor through "blurring" of the different sources of flavor which are present in the sauce. The frozen food product may then be heated in the hermetically sealed package until it is thawed, the package may then be so positioned as to release the contents in such a way that the sauce is distributed in a superposed position with respect to the starchy food, and the product is ready to eat.

The invention may be illustrated further by reference to the drawings which accompany this application.

Figure 1:
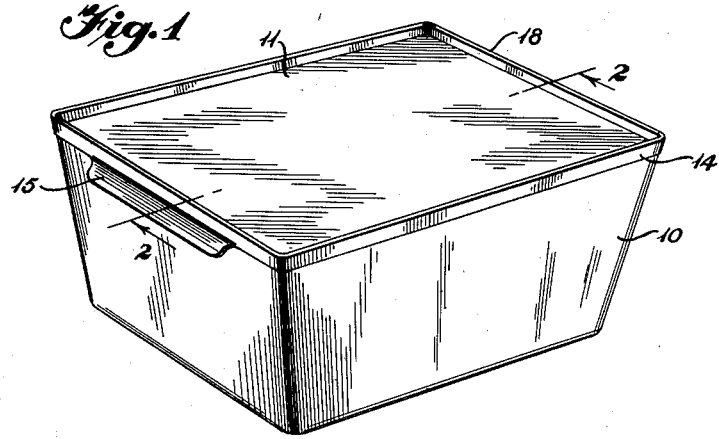
Fig. 1 is a perspective view of a container enclosing a frozen food product in hermetically sealed condition.
Figure 2:
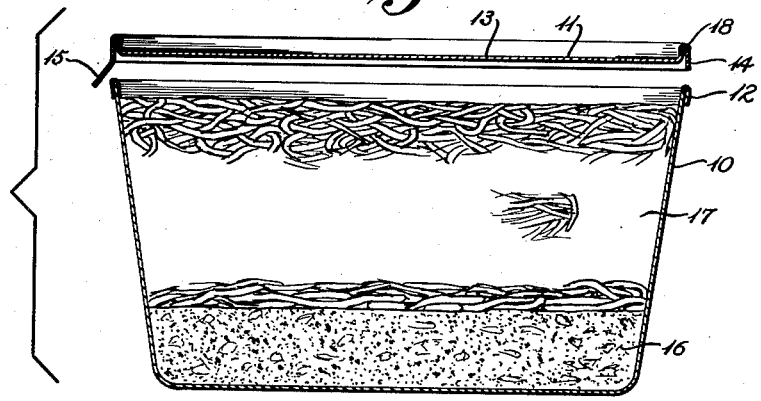
Fig. 2 is a sectional view in vertical elevation along line 2—2 of Fig. 1.

Although a wide number of different packaging materials and package shapes are available today for use in the frozen food field, it has been found highly desirable, with products of the type to which this invention relates, to employ a package of thin aluminum foil of the shape illustrated in Fig. 1. Such a package is rectangular in horizontal cross section, but is in the form of an isosceles trapezoid in vertical cross section in any direction (Fig. 2). The particular utility of a container of this shape will be more evident as the description of the invention proceeds.

Where the container 10 is fabricated from thin aluminum sheet or foil, the conductive metal greatly facilitates heat transfer to and from the contents of the package. Consequently, freezing and cooking of the product can be accomplished quite rapidly. In order to seal the package hermetically, the container 10 may be provided along the upper periphery of its walls with a reinforced edge portion 12 formed by doubling back a part of the sheet upon itself. The sealing member or lid 11 may be similarly formed of thin metal sheet or foil. The sealing member need not be as thick or strong structurally as the container, since its function is sealing rather than structural. The sealing member 11 provided with a depending peripheral strip 14 which is approximately the same size as the reinforced lip 12 of the container. In order to seal the container hermetically, it is merely necessary to crimp together the strip 14 around the edge of the sealing member, and the reinforced portion 12 of the container wall. In order to facilitate opening of the package, the lid 11 is desirably provided with a gripping tab 15, which may be merely an extension of one side of the peripheral strip 14.

In preparing a frozen food according to the present invention, the particular shape of the container is quite important. Where the container, in vertical cross section, is an isosceles trapezoid as described above, removal of the frozen food product from the container is considerably facilitated. Furthermore, adjacent packages are more easily frozen and later separated, despite thin coatings of ice which may form on the surface of the packages where condensation takes place on the outer surfaces of the container. However, while the shape of the package is preferably as described above, it should be understood that the process of the present invention may be employed in connection with packages of practically any size and shape. Preferably, packages of a relatively small size are employed in order to simplify heat exchange, thus facilitating freezing and thawing operations.

Where the frozen food product which is prepared according to the present invention is spaghetti with sauce, the following general procedure may be observed. The sauce is cooked and prepared in such a way that it is ready for eating. It is then placed in the bottom of the container 10 where it forms a relatively thick bottom layer 16. Where the container is of a size to contain about 24 ozs. liquid, it has been found that 6 to 10 ozs. of sauce is an adequate portion. The sauce is frozen in the container 10 so that the layer of sauce 16 becomes a solid, frozen block. It has been found that freezing is an adequate preservation method for almost all types of spaghetti sauces for periods of time corresponding to normal shelf life periods. The frozen block of sauce 16 is thus preservable for large scale distribution and will retain its original flavor and aromas as long as it is maintained in its frozen state.

In order to complete the frozen food product, freshly cooked spaghetti is drained and enough is placed in the container 10 to fill the container completely. Although the lid 11 may be hermetically sealed on the container either before or after freezing of the food, it is preferred to seal the package before freezing in order to eliminate any possibility of contamination of the food during freezing. Therefore, after filling the container 10 with the cooked, drained spaghetti 17, the sealing lid 11 is hermetically sealed to the container by crimping the lid 11 to the reinforced upper area 12 of the container around the entire periphery of the lid. The crimping operation produces a central depression 13 in the lid while forming, at the same time, a raised peripheral edge 18 around its circumference.

After the sealed food package is completely frozen, it is ready for storage. When it is desired to consume the contents of the package, it may be heated sufficiently to thaw the contents and heat them to consuming temperature. The heating may be done by placing the sealed container in an oven. It is desirable that the hermetic seal be maintained until after the thawing and heating has taken place. As the temperature within the frozen food container is raised, steam is generated which is kept within the container by the hermetic seal. This steam is very effective in producing the desired thawing and heating action within the container. After the package is sufficiently heated for consumption, the lid 11 of the container may be removed easily by gripping the tab 15 and lifting it. This exposes the contents of the package to view. It is quite obvious that even after thawing and heating, the sauce has not migrated into the spaghetti, but has remained in the bottom layer 16. In order to serve the spaghetti, a plate is placed over the package, and the container is then inverted. In order to dispense the contents, it is merely necessary to lift the container away from the food.

Figure 3:
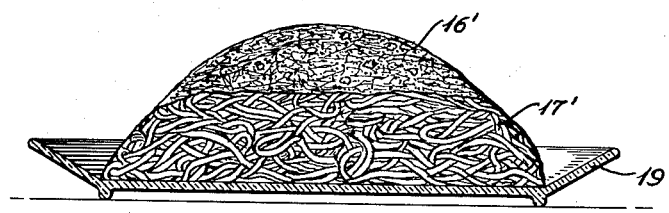
Fig. 3 is a side elevation in partial section of a food product prepared and dispensed from the package illustrated in Figs. 1 and 2.

The spaghetti, since it is limp, will then lose the shape of the package and tend to conform to the shape of the plate. It will be found that the sauce portion tends to remain in position on top of the spaghetti, as depicted in Fig. 3. The heated sauce 16' appears to be freshly prepared sauce which has just been placed over a batch of freshly cooked spaghetti 17'. Not only is the appearance identical with a freshly prepared food product, but the taste, texture and aroma of the food are indistinguishable from the freshly prepared product.

In order to make the invention more clear, a few specific examples of applications of the invention will be described.

EXAMPLE I

*Frozen spaghetti alla novelli*

Spaghetti alla novelli may be prepared according to any standard recipe. A suitable recipe may be found in "The Talisman Italian Cook Book" by Ada Boni, published by the Crown Publishers, Inc., 419 Fourth Avenue, New York 16, New York. After a sauce has been prepared as described by Boni on page 151, 8 ozs. may be placed in the bottom of a sheet aluminum container and frozen at a temperature of about 0° F. Freshly cooked spaghetti is drained thoroughly and is then placed over the frozen sauce in a quantity sufficient to fill the container. The container is then hermetically sealed and the entire contents of the container are chilled to about 0° to 10° below zero. After the contents have been frozen, the package may be stored for several months at 0° F. without deterioration of the contents.

In order to consume the contents, the closed container is heated in an oven for one hour at 450° F. This is sufficient to thaw the spaghetti completely and warm the contents of the container to normal consumption temperatures. The spaghetti and sauce may be dispensed from the package by inverting the package on a plate. The product prepared in this way is indistinguishable in any respect from freshly prepared spaghetti alla novelli. The spaghetti has the texture of freshly cooked spaghetti. The aroma and flavor of the sauce are unimpaired.

EXAMPLE II

*Frozen gnocchi*

Gnocchi are Italian style dumplings which may be prepared in a variety of ways. Green gnocchi are prepared by mixing together potatoes, spinach, egg yolks, cheese, salt, and sufficient flour to form a binder. These ingredients are cut into pieces about one to two inches long, and are cooked in boiling salted water. Gnocchi are desirably served with a tomato sauce. There are a great many recipes for tomato sauces, and practically all tomato sauces are satisfactory for preservation by freezing. In order to prepare a frozen gnocchi food product, about 6 ozs. of tomato sauce are placed in a container and frozen. The cooked gnocchi are then placed on the frozen layer of sauce in the container in a quantity sufficient to fill the container. The container is then hermetically sealed, and the contents of the container are frozen.

The frozen gnocchi and sauce are prepared for consumption in practically the same manner as were the spaghetti and spaghetti sauce. The hermetically sealed container with its frozen contents are placed in an oven and heated for about an hour at 350° F. After this length of time, the contents are heated to a temperature satisfactory for eating. The sealing lid is removed, and the package is inverted on a serving plate. The product thus obtained is indistinguishable from freshly prepared green gnocchi with tomato sauce. There is no other method now in use for distributing on a large scale a product which makes available to all, with a minimum of trouble and preparation, frozen food products which are indistinguishable from freshly prepared products. This is particularly so in the case of dumplings. Dumplings are notorious for their sogginess if they are allowed to remain in contact with liquids for any length of time. Nothing is less tasteful or less appetizing than a soggy dumpling. Only by the process of the present invention is there made available to the public a dumpling preparation which retains the texture and flavor of freshly prepared products, despite the fact that mass distribution is possible through employment of the present invention.

EXAMPLE III

Frozen rice with sausage

While dumplings present the most serious problems of absorption with consequent sogginess, rice is also notorious for swelling and disintegrating after prolonged contact with liquid. With the present invention, it is perfectly possible to prepare a number of frozen rice dishes which are appetizing and pleasant in appearance when consumed.

Rice with sausage may be prepared by cooking rice in boiling water or soup stock until it is tender. The sausage may be prepared in a sauce such as that described by Boni on page 162 of her book, previously referred to. Alternatively, any other type of sauce may be employed. The reference to Boni is made merely by way of suggestion, and this reference is made merely for clarification of the invention.

In preparing frozen rice with sausage, the sausage sauce is placed in the bottom of the container. In a 21 oz. container about 10 to 12 ozs. of sausage in sauce may be placed in the container. The layer of sausage is then frozen. The cooked rice is then drained and placed on top of the frozen sausage sauce in a quantity sufficient to fill the container. The container is then hermetically sealed, and the contents are frozen rapidly at low temperature. To serve the product, it is merely necessary to heat in an oven for about 45 minutes at 400° F. Shorter heating periods are desirable with rice products in order to avoid undesirable excessive contacts between the lowermost rice grains and the sausage sauce.

When the heated food product is dispensed from the container by inverting it, the rice with sausage looks and tastes exactly like a freshly prepared food. When it is sprinkled with cheese, it is ready to eat. A serving of 21 ozs. of this food product is more than ample for one person.

EXAMPLE IV

Frozen ravioli

Ravioli is prepared by inclosing within two strips of dough a small quantity of a meat-containing mixture. The portions of ravioli are then cooked by boiling them in water for about twenty minutes. Ravioli is usually served with a meat sauce, although any type of sauce such as a tomato or mushroom sauce may also be employed.

In order to prepare a frozen ravioli food product, a cooked sauce is fresh frozen in a container. In a 21½-oz. liquid measure container, 4 to 6 ounces of ravioli sauce are sufficient. Over the frozen sauce layer there is placed a sufficient quantity of cooked and drained ravioli to fill the container. The container is then hermetically sealed and the entire package is frozen rapidly at a low temperature.

The frozen product may be thawed and heated to a temperature suitable for consumption by placing the frozen food container in an oven for about an hour at about 350° F. After removing the sealing lid and inverting the container on a serving plate, a delicious food is ready for eating.

EXAMPLE V

Frozen manicotti

Manicotti or little muffs are somewhat similar to ravioli. Manicotti is prepared by inclosing within rectangles of soft dough a small amount of ricotta. The portions of manicotti are then boiled for about 10 minutes in salted water. Manicotti is customarily served with tomato sauce, although other types of sauce may be used.

In order to prepare frozen manicotti, the sauce is frozen as the bottom layer in a container. In a 21⅓ oz. liquid measure container, about 4 to 6 ozs. of sauce are sufficient. Over the frozen sauce are placed the pieces of manicotti. The container is then hermetically sealed and the contents are frozen rapidly at a low temperature.

In order to prepare the manicotti for consumption, it is heated for about an hour in a hot oven. Upon inversion of the container, delicious manicotti, covered with sauce, is available. The texture of the dough is good, free from sogginess. The aroma and flavor of the sauce are precisely the same as those of a freshly made sauce.

EXAMPLE VI

Frozen pennoni with mushroom sauce

Pennoni wish mushroom sauce may be easily prepared as a frozen food product. The mushroom sauce is made up first. In a 21⅓ oz. liquid measure container, about 5 to 7 ozs. of the sauce may be employed. The pennoni type macaroni is boiled separately from the sauce, and after draining, is placed over the frozen sauce in an amount sufficient to fill the container. After the container is hermetically sealed, it may be frozen at about —10° F. The frozen product may be stored for several months at 0° F. with no evidence of deterioration, loss of flavor, or loss of texture and aroma.

The pennoni macaroni is prepared for serving by heating in an oven in the hermetically-sealed container. After dispensing from the container, a delicious macaroni dish is available which is identical in consumption attractiveness to the freshly-prepared product. The individual pieces of macaroni retain their freshly-cooked characteristics and are not soggy or saturated with oils or other components of the sauce.

While this example has described pennoni macaroni, it will be obvious that any other type of macaroni may be substituted for pennoni.

EXAMPLE VII

Frozen lasagne

In order to prepare a frozen noodle and sauce product, lasagne is prepared and cooked in boiling water for about 20 minutes. A meat sauce is prepared separately. In a 21⅓ oz. liquid measure container, about 4 to 6 ozs. of meat sauce is sufficient. The meat sauce is frozen in the bottom of the container and the container is then filled with cooked, drained lasagne. After hermetic sealing, the entire package is rapidly frozen to about —10° F.

It has been found that this product may be stored for several months during distribution and normal handling. No loss in flavor or aroma is discernible. The texture of the noodles, even in the layer adjacent the frozen sauce, is identical with that of freshly-prepared noodles. This invention thus provides a means for temporarily preserving all types of noodles and similar products, together with a sauce.

In each of the examples above, there has been disclosed a specific type of starchy food product which is served with a sauce. While in some of the examples, reference has been made to tomato sauce or meat sauce or mushroom sauce, it should be understood that any type of sauce which is susceptible to preservation by freezing may be employed equally well. Similarly, all types of starchy food products such as noodles, dumplings, ravioli, macaroni, spaghetti, and rice are susceptible of use in connection with this invention.

While the preferred form of container has been described in detail above, a great many forms of containers may be employed. However, in order to preserve the illusion that the thawed and heated frozen food product is freshly prepared, the sauce layer must be confined in a space which is relatively compact and fairly deep. Thus, when the package is inverted to dispense the product for consumption, the sauce will be ejected from the package as a compact body rather than as a thin layer. This compact body more nearly simulates a freshly prepared product than a thin layer, since when freshly prepared sauce is dispensed from a spoon, or a ladle, it tends to be dispensed in a relatively small area. Furthermore, if the sauce is maintained in a compact body within the frozen package, there is less area of contact between the sauce and the starchy food product than would be the case if a large area, relatively thin layer were employed for the sauce.

Having described the invention in detail, I claim:

1. A method of preparing a frozen food package comprising cooking a condiment-containing sauce, separately cooking and then draining a foodstuff selected from the group consisting of rice and shaped and dried products of paste and alimentary paste, placing a relatively thick layer of said sauce in a container of heat-conductive, moisture-impervious, self-supporting inert sheet material having an open top face closable with a lid of similar inert sheet material to render said container substantially moistureproof, freezing said sauce in situ in said container to form a solid block of frozen sauce, filling the remainder of said container with said drained foodstuff, closing container to render it substantially moisture-proof, and freezing said foodstuff.

2. A method of preparing a frozen spaghetti dinner package comprising cooking a condiment-containing sauce, separately cooking and then draining spaghetti, placing a relatively thick layer of said sauce in a container of heat-conductive, moisture-impervious, self-supporting inert sheet metal having an open top face closable with a lid of similar inert sheet metal to render said container substantially moisture-proof, freezing said sauce in situ in said container to form a solid block of frozen sauce, filling the remainder of said container with said drained spaghetti, closing said container to render it substantially moisture-proof, and freezing said spaghetti.

3. A method of preparing a frozen food package comprising cooking a condiment-containing sauce, separately cooking and then draining a foodstuff selected from the group consisting of rice and shaped and dried products of paste and alimentary paste, providing a container of heat-conductive, moisture-impervious, self-supporting inert sheet material having an open top face closable with a lid of similar inert sheet material to render said container substantially moisture-proof, forming said sauce into a relatively thick frozen block complementary in shape with the bottom of said container and positioned therein, filling the remainder of said container with said drained foodstuff, closing said container to render it substantially moisture-proof, and freezing said foodstuff.

References Cited in the file of this patent

UNITED STATES PATENTS

| | | |
|---|---|---|
| 1,634,332 | McGowan | July 5, 1927 |
| 1,955,484 | Birdseye | Apr. 17, 1934 |
| 2,166,278 | Alderfer | July 18, 1939 |
| 2,674,536 | Fisher | Apr. 6, 1954 |

FOREIGN PATENTS

| | | |
|---|---|---|
| 646,499 | Great Britain | Nov. 22, 1950 |

OTHER REFERENCES

"Modern Packaging," November 1946, pages 130 and 131, article entitled Frozen Cooked Meals.

"Food Engineering," November 1951, page 156, article entitled Frozen Meals Encased in Aluminum.

"Frosted Food Field," August 1952, page 24, article entitled Frigi Dinner is Offering Franchises for its Group-Feeding Combination.